(12) United States Patent
Barker et al.

(10) Patent No.: US 7,837,905 B2
(45) Date of Patent: Nov. 23, 2010

(54) METHOD OF MAKING REINFORCED FILAMENT WITH DOUBLY-EMBEDDED NANOTUBES

(75) Inventors: Delmar L. Barker, Tucson, AZ (US); Mead M. Jordan, Tucson, AZ (US); W. Howard Poisl, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 223 days.

(21) Appl. No.: 12/121,985

(22) Filed: May 16, 2008

(65) Prior Publication Data
US 2009/0286079 A1   Nov. 19, 2009

(51) Int. Cl.
*D01D 5/12* (2006.01)
*D01F 1/10* (2006.01)
*D01F 9/22* (2006.01)
(52) U.S. Cl. ............... 264/29.2; 264/210.6; 264/211
(58) Field of Classification Search ............... 264/210.6, 264/211, 29.2, 485, 488, 495; 423/447.1
See application file for complete search history.

(56) References Cited

U.S. PATENT DOCUMENTS

| | | | | |
|---|---|---|---|---|
| 2007/0137786 A1* | 6/2007 | Luzzi | ............... | 264/485 X |
| 2008/0019485 A1* | 1/2008 | Weiss et al. | ............... | 378/199 |
| 2009/0242850 A1* | 10/2009 | Park et al. | ............... | 252/511 |

OTHER PUBLICATIONS

Daenen et al., The wonderous world of carbon nanotubes, Eindhoven University of Technology, Feb. 27, 2003, pp. 1-23.

Striemer et al., Charge- and size-based separation of macromolecules using ultrathin silicon memranes, 2007 Nature Publishing Group, pp. 749-753.

P. M. Ajayan, Nanotubes from carbon, 1999 American Chemical Society, May 1, 1999, pp. 1787-1799.

Kumar et al. "Stabilization and Carbonization of Gel Spun Polyacrylonitrile/Single Wall Carbon Nanotube Composite Fibers" Feb. 28, 2007, AFRL-SR-AR-TR-07-0088.

Sreekumar et al. "Polyacrylonitrile Single-Walled Carbon Nanotube Composite Fibers" Adv. Mater. 2004, 16, No. 1, Jan. 5, pp. 58-61.

(Continued)

*Primary Examiner*—Leo B Tentoni
(74) *Attorney, Agent, or Firm*—Eric A. Gifford

(57) ABSTRACT

Strengthened filaments and fibers are realized by mixing and dissolving monomer and catalyst in a solvent into open-ended nanotubes to form a polymer precursor prior to polymerization in which the open nanotubes are filled with monomer and catalyst. The remaining steps for forming a stabilized filament may follow the conventional sequence. The result is that the nanotubes are "doubly-embedded" in the polymer matrix (bonds to the polymer inside and extending through the nanotube and bonds to other polymer chains outside the nanotube) in the filament. These additional bonds provide additional mechanical strength. The number of bonds may be further enhanced by pretreating the nanotubes to create defects in the nanotubes to form sites along the inner and outer walls for additional polymer-to-nanotube bonds. The aligned filaments may be radiated to create additional polymer-to-nanotube bonds such as between the polymer chain inside the nanotube and the inner walls of the nanotube and to create nanotube-to-nanotube bonds. In the case of carbon fiber, the carbonized filament may be radiated to create additional carbon-carbon bonds prior to twisting the filaments into the fiber.

20 Claims, 10 Drawing Sheets

OTHER PUBLICATIONS

Mahfuz et al. "Manufacturing and Characterization of Carbon Nanotube/Polyethylene Composites" Int. Journal of Nanoscience vol. 4, No. 1 (2005) 55-72.

Liu et al. "Encapsulation of polystyrene within carbon nanotubes with the aid of supercritical CO2", Letters to the Editor, Carbon 42 (2004) 423-460.

* cited by examiner

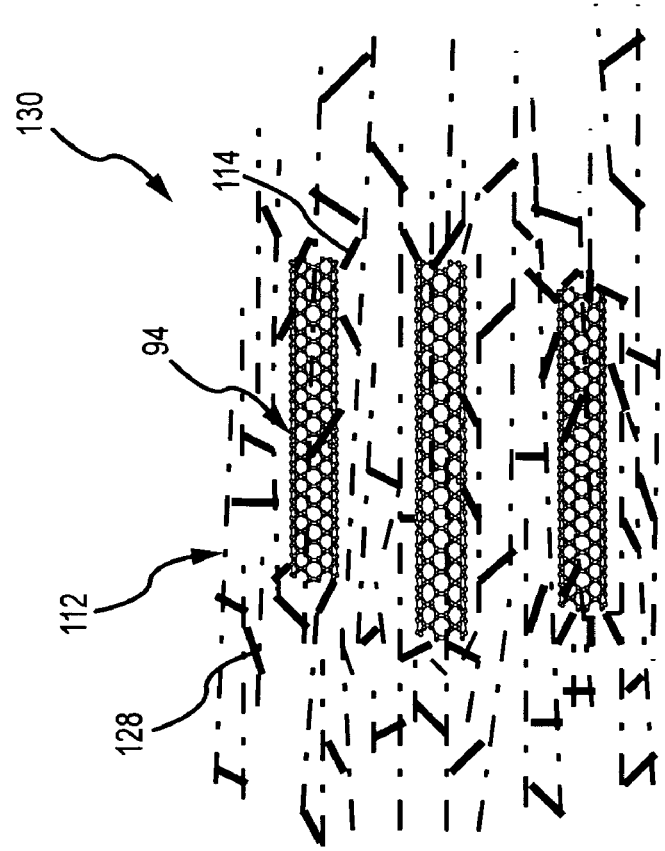
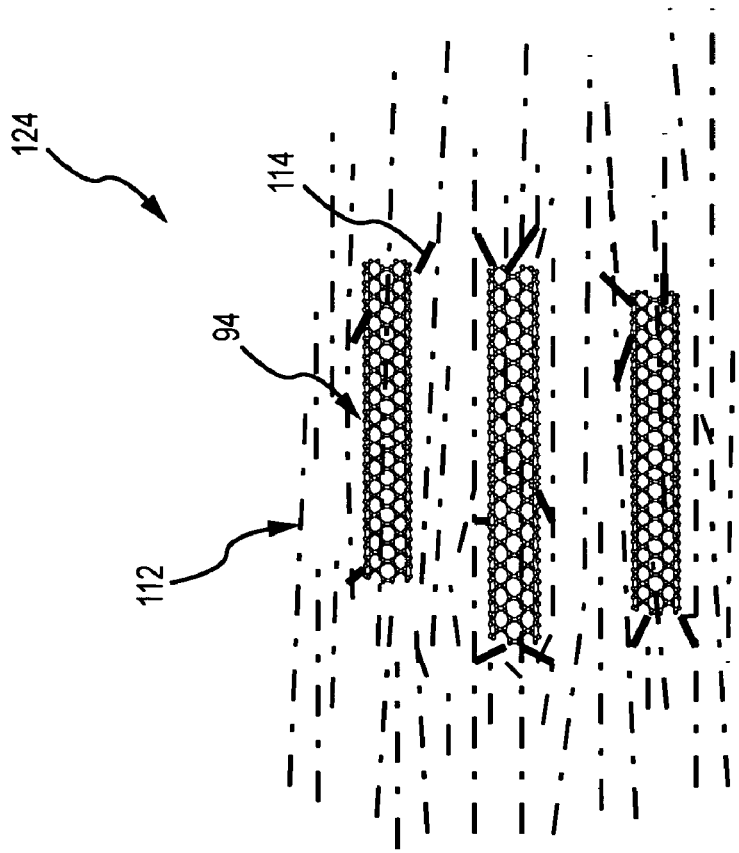

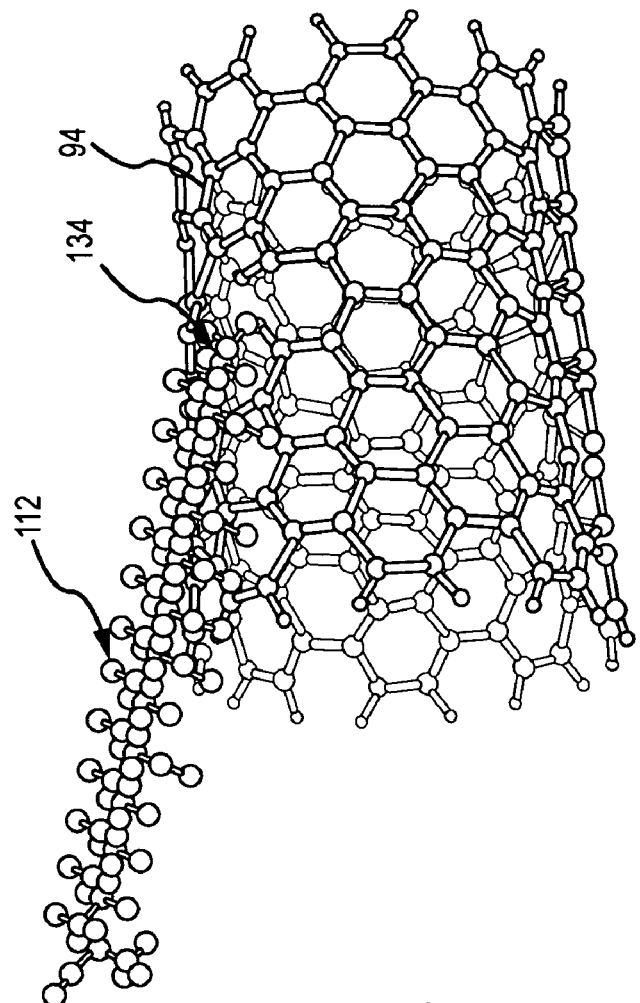
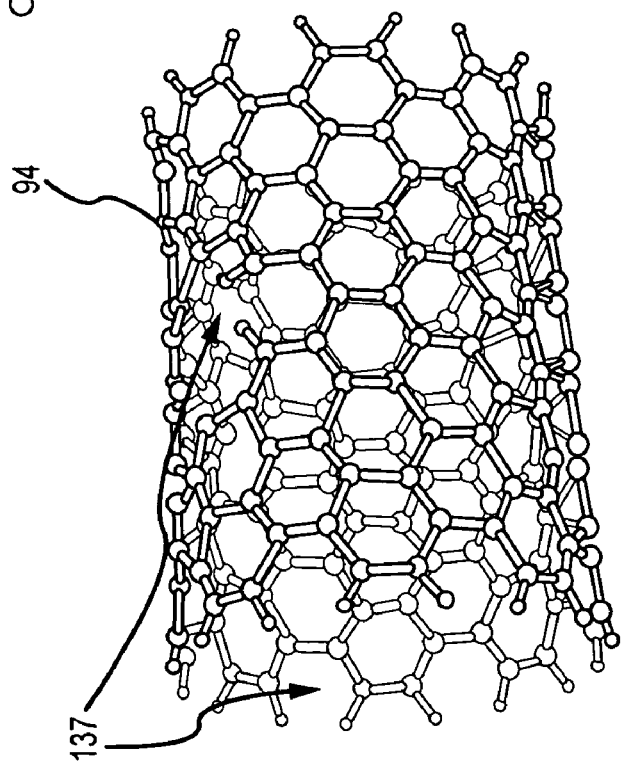
FIG.6b
FIG.6a

METHOD OF MAKING REINFORCED FILAMENT WITH DOUBLY-EMBEDDED NANOTUBES

BACKGROUND OF THE INVENTION

1. Field of the Invention

This invention relates to polymer-based filaments and fibers and methods of reinforcement using nanotubes.

2. Description of the Related Art

Nearly all carbon fiber composite materials are based on carbon fibers which are bundles of thousands of carbon filaments of 5-10 microns in diameter. The filaments are composed of stacked graphene sheets held together by Van der Waals forces produced from precursors and a multistep manufacturing process. Typical carbon fiber precursors are polyacrylonitrile (PAN), mesophase pitch, or rayon. The mechanical characteristics of the fiber depend on the precursor material, optimization of processes to form fibers, and processing temperatures.

The process for making carbon fibers is part chemical and part mechanical. The precursor is drawn into long strands or fibers and then heated to a very high temperature without allowing it to come in contact with oxygen. Without oxygen, the fiber cannot burn. Instead, the high temperature causes the atoms in the fiber to vibrate violently until most of the non-carbon atoms are expelled. This process is called carbonization and leaves a fiber composed of long, tightly inter-locked chains of carbon atoms with only a few non-carbon atoms remaining.

A typical sequence of spinning, stabilizing, carbonizing, surface treatment and sizing to produce a carbon fiber from a PAN precursor is illustrated in FIG. 1. A monomer having a carbon-carbon backbone such as acrylonitrile (CH2CHCN) is mixed (step 10) with a catalyst. The mixture 12 is polymerized (step 14) to form a PAN polymer 16 including long polymer chains formed from the monomers. The PAN polymer is spun (step 18) into filaments 20, washed and stretched (step 22) to produce aligned filaments 24 in which the polymer chains are aligned along a common axis and having a final diameter. After spinning, the filaments are heated in air (200-300 degrees C for up to 120 minutes) (step 26) to form poly/poly bonds between individual polymeric chains to produce stabilized filaments 28. The stabilized filaments are heated (carbonized) (step 30) in an atmosphere without oxygen at temperatures of 1000-3000 degrees C. to produce carbonized filaments 32. This removes non-carbon atoms from the filaments and forms more tightly bonded carbon atoms parallel to the long axis of the filament. This process promotes the formation of graphite flakes in the filaments. After carbonizing, the surface of the filaments are oxidized (step 34) to form a coated filament 36 to provide better chemical bonding properties and to roughen the surface for better mechanical bonding properties. The coated filaments are coated (sized) with materials compatible with the adhesives used to form composite materials and spun (step 38) into the macro carbon fiber 40.

Carbon fibers have the highest tensile strength of reinforcements for composite materials, but improvements in the mechanical properties can be made by adding other materials during their synthesis. Adding carbon nanotubes (CNT) to carbon fibers also allows better control of the thermal and electrical properties of the final material. Researchers have introduced single and multi-walled CNTs which have superior mechanical properties to carbon fibers to the synthesis process of carbon fibers (See Thaliyil V. Sreekumar et al. "Polyacrylonitrile Single-Walled Carbon Nanotube Composite Fibers" Adv. Mater. 2004, 16, No. 1, January 5, pp. 58-61). The CNTs 42 are added (step 44) after the acrylonitrile has been polymerized in step 14 to form PAN polymer 16. As shown in FIG. 2, poly/poly bonds 46 are formed between PAN polymer chains 16, bonds 48 are formed between PAN polymer chains 16 and CNTs 42 only at the surface of the CNTs and carbon/carbon bonds 50 are formed between CNTs 42 and graphite flakes 52. The CNTs are encapsulated in the bonded polymer chains but the number of actual bonds to the CNTs is limited. Poor bonding of CNTs limits the increases in mechanical strength of the resulting carbon fibers.

SUMMARY OF THE INVENTION

The present invention provides for reinforced filaments and macro fibers with doubly-embedded nanotubes and method of manufacture that increases mechanical strength. This approach is particularly well-suited for reinforcing carbon fiber formed from a monomer having a carbon-carbon backbone reinforced with carbon nanotubes. However, the approach is generally applicable to carbon-carbon, carbon-based and non-carbon monomers for creating the polymer filament itself and to Carbon, Germanium, Boron, Boron-Nitride, Boron-Carbide, $C_iB_jN_k$, Silicon and Silicon-Carbide nanotubes, single or multi-walled.

Strengthened filaments and fibers are realized by mixing and dissolving monomer and catalyst in a solvent (such as alcohol, ketone or supercritical fluid) into open-ended nanotubes to form a polymer precursor in which the open nanotubes are filled with monomer and catalyst. The remaining steps for forming a stabilized polymer filament may follow the conventional sequence. The result is that the nanotubes are "doubly-embedded" in the polymer matrix (bonds to the polymer inside and extending through the nanotube and bonds to other polymer chains outside the nanotube) in the filament. These additional bonds provide additional mechanical strength. The number of bonds may be further enhanced by pretreating the nanotubes to create defects in the nanotubes to form sites along the inner and outer walls for additional polymer-to-nanotube bonds. The aligned filaments may be radiated to create additional polymer-to-polymer, and polymer-to-nanotube bonds such as between the polymer chain inside the nanotube, and the inner walls of the nanotube, and to create nanotube-to-nanotube bonds. In the case of carbon fiber manufacture, the carbonized filament may be radiated to create additional carbon-carbon bonds between the CNTs and the carbon from the polymer.

These and other features and advantages of the invention will be apparent to those skilled in the art from the following detailed description of preferred embodiments, taken together with the accompanying drawings, in which:

BRIEF DESCRIPTION OF THE DRAWINGS

FIGS. 5a-5e are diagrams illustrating the sequence of manufacturing processes to doubly-embed nanotubes to reinforce the carbon filament;

FIGS. 6a and 6b are bond diagrams illustrating the dangling bonds at the open ends and along the walls of the carbon nanotubes and the polymer-to-carbon bonds formed thereat.

DETAILED DESCRIPTION OF THE INVENTION

Figure 1:
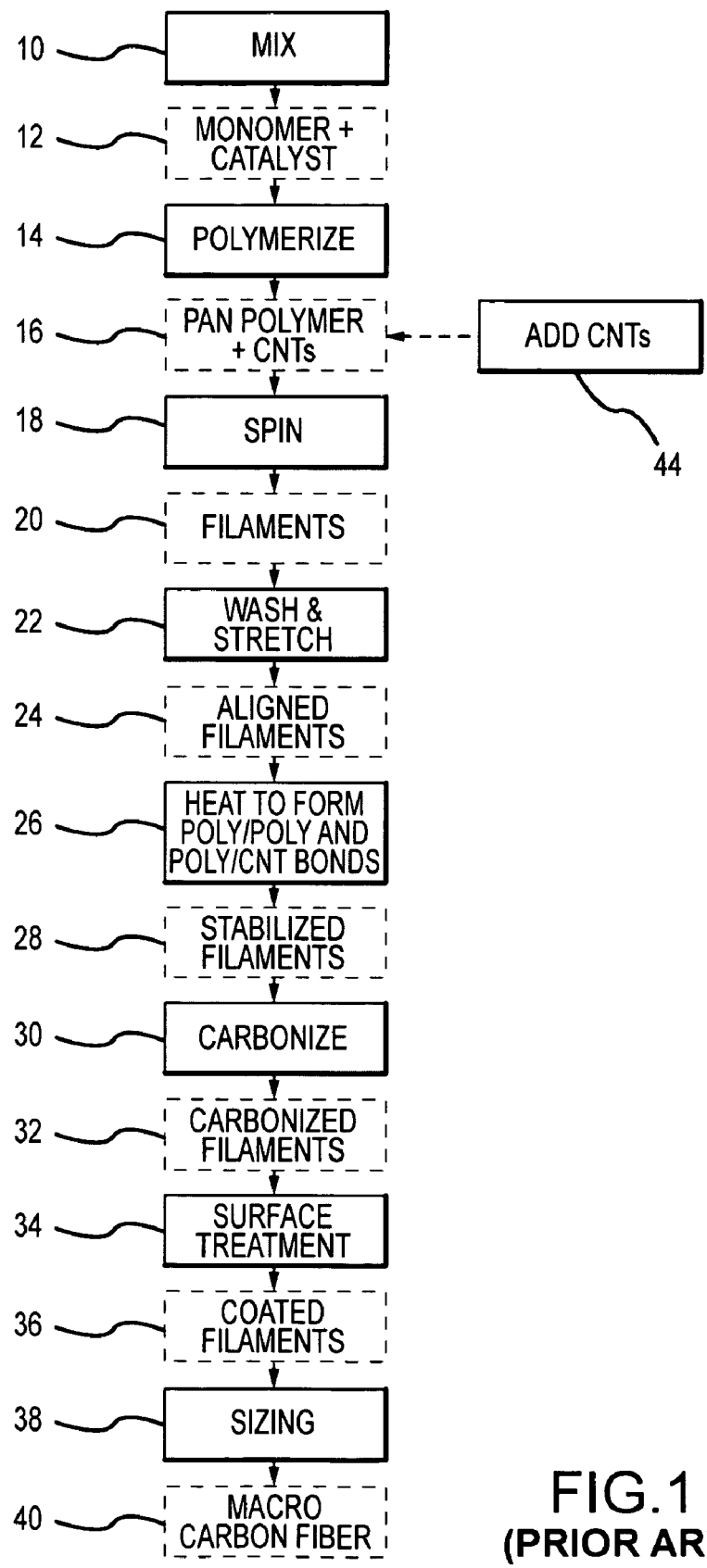
FIG. 1, as described above, is a flow diagram of a known process for reinforcing carbon fiber with carbon nanotubes.
Figure 2:
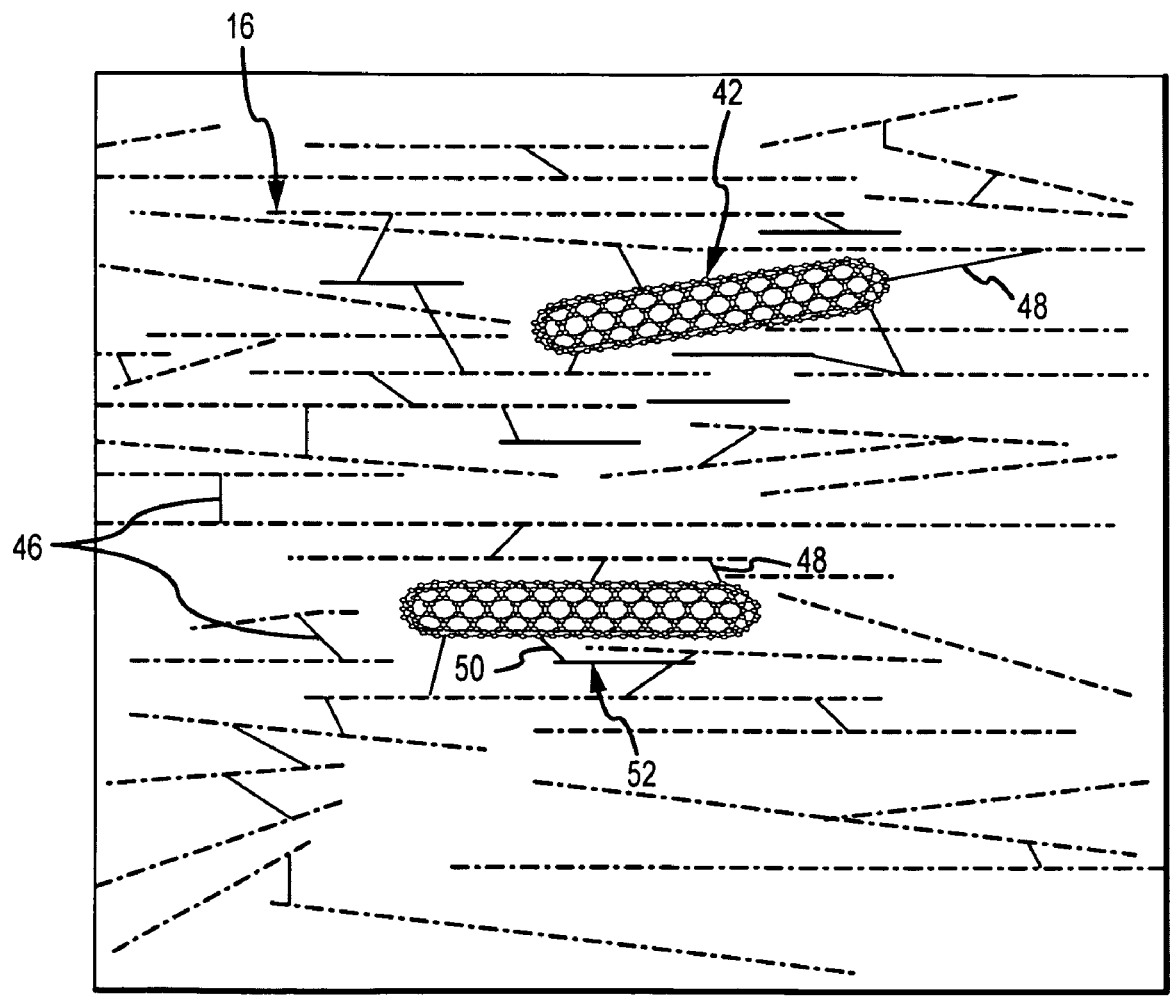
FIG. 2, as described above, is a diagram of a stabilized carbon filament illustrating the bond structure between the polymer chains and the carbon nanotubes.
Figure 3A:
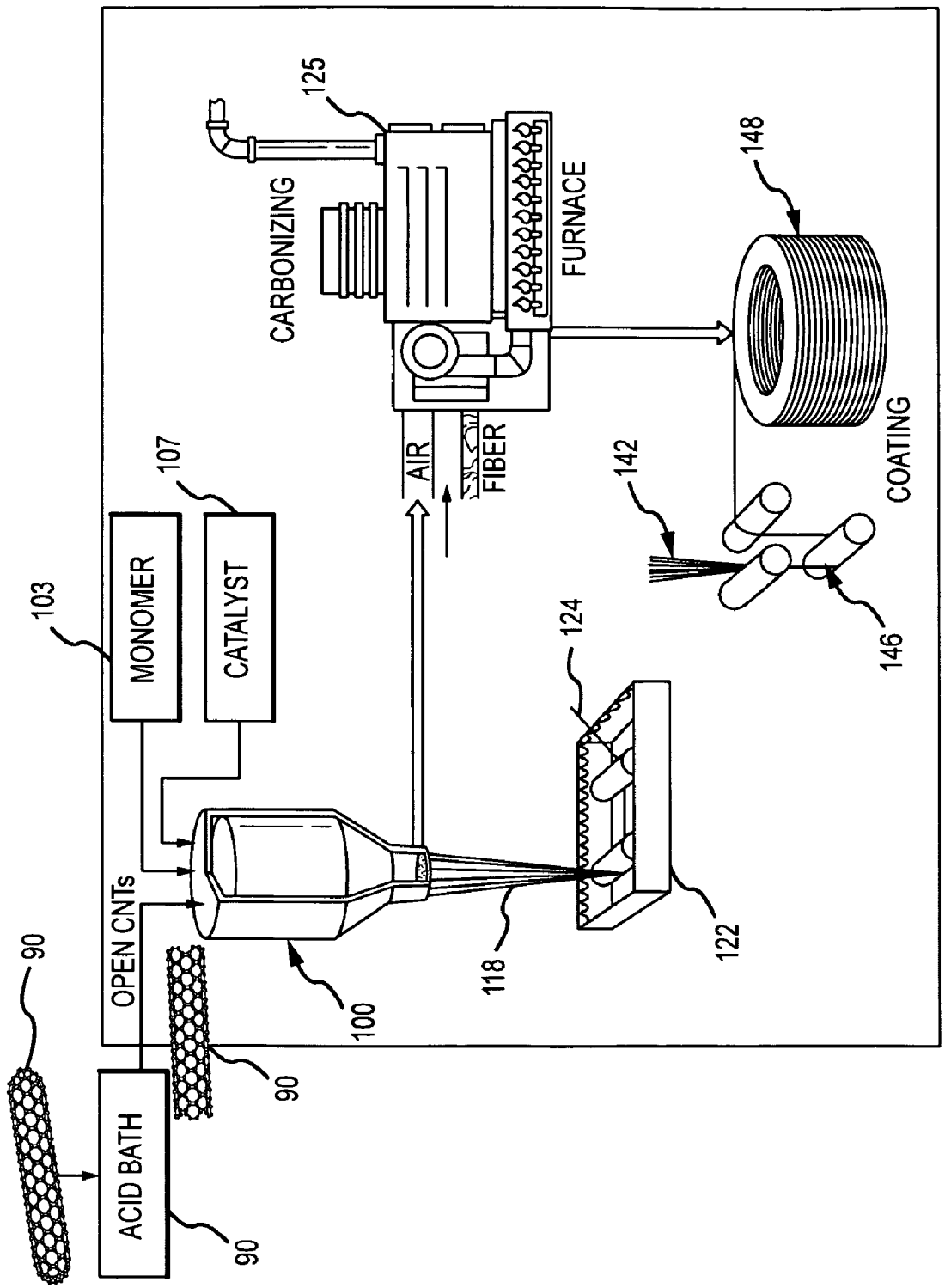
FIGS. 3a and 3b illustrate a manufacturing process for reinforced carbon fiber in accordance with the present invention.
Figure 3B:
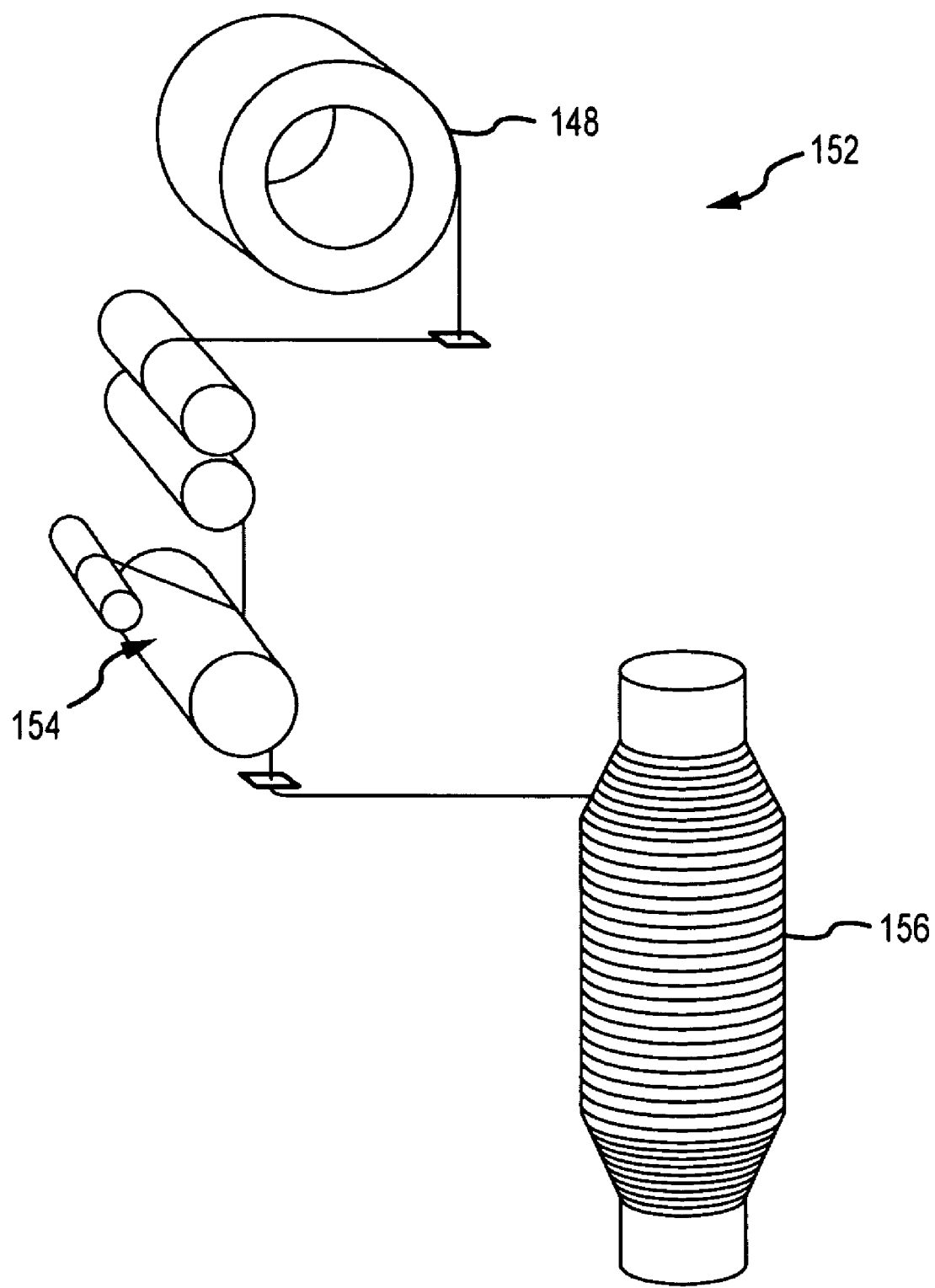
Figure 4:
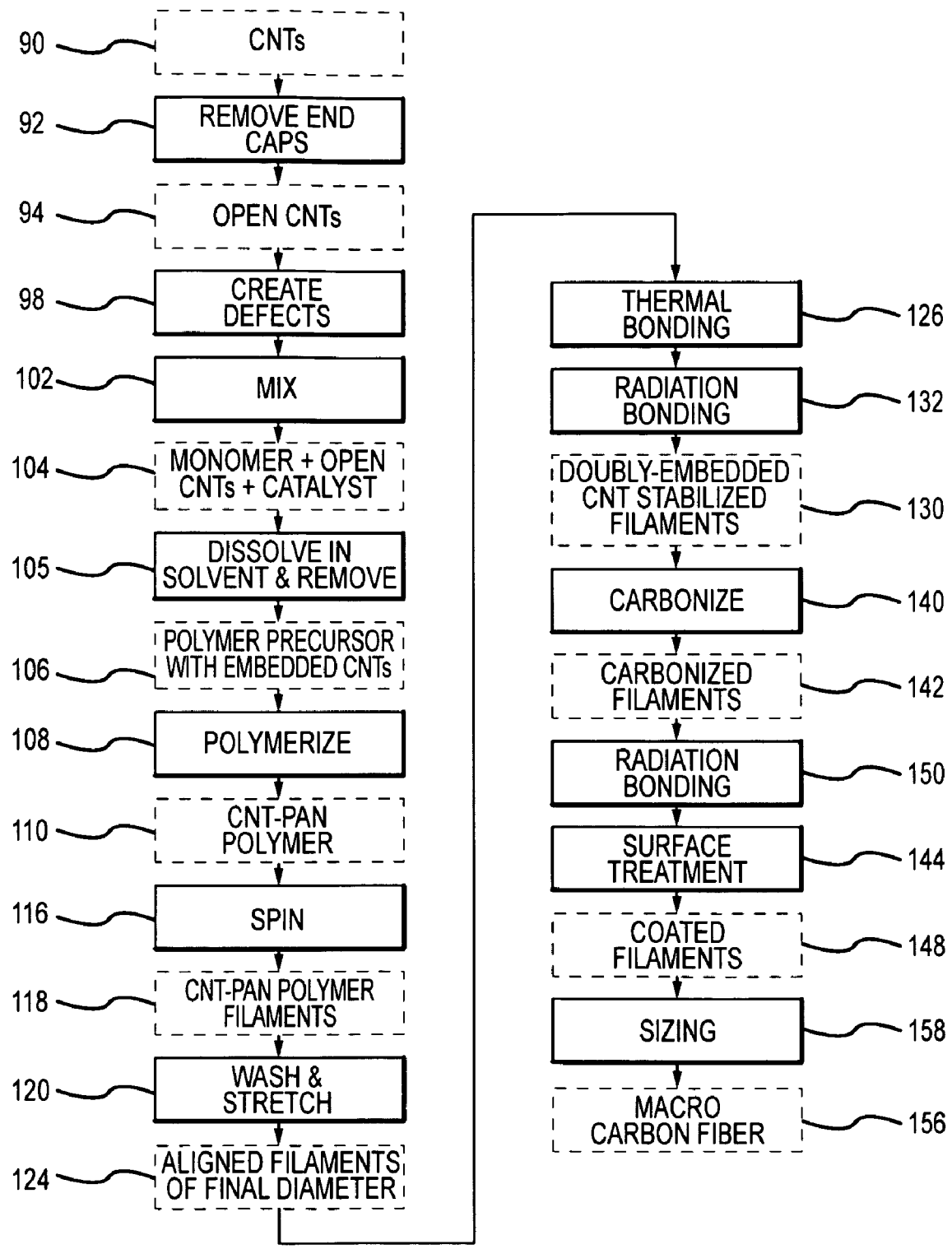
FIG. 4 is a flow diagram of the manufacturing process.

The present invention provides for reinforced filaments and macro fibers with doubly-embedded nanotubes and method of manufacture that increases mechanical strength. This approach is particularly well-suited for reinforcing carbon fiber formed from a monomer having a carbon-carbon backbone with carbon nanotubes. However, the approach is generally applicable to carbon-carbon, carbon-based and non-carbon monomers for creating the polymer filament. A monomer (from Greek mono "one" and meros "part") is a small molecule that may become chemically bonded to other monomers to form a polymer. The most common carbon-carbon monomer for the production of macro carbon fiber is acrylonitrile. Other carbon-carbon monomers include olefins e.g. ethylene and propylene. Examples of carbon-based monomers include carbonate, ethersulfone, imide, phenyloxide, phenylene Sulfide, two separate monomers for Nylon and three separate monomers for ABS. An example of a non-carbon monomer is silicones that have a Si—O backbone. The nanotubes, single or multi-walled, may be grown from Carbon, Germanium, Boron, Boron-Nitride, Boron-Carbide, $C_iB_jN_k$, Silicon and Silicon-Carbide. Although not required, if the monomer and nanotube share a common element, e.g. carbon, the bond strength, hence reinforced mechanical strength of the filament may be better. Other than for acrylonitrile, the other polymer filaments are not typically assembled into macro fibers.

Strengthened filaments and fibers are realized by mixing and dissolving monomer and catalyst in a solvent (such as alcohol, ketone or supercritical fluid) into open-ended nanotubes and removing the solvent to form a polymer precursor in which the open nanotubes are filled with monomer and catalyst. The remaining steps for forming a stabilized filament and, in the case of carbon fibers, then a macro fiber may follow the conventional sequence. The result is that the nanotubes are "doubly-embedded" in the polymer matrix (bonds to the polymer inside and extending through the nanotube and bonds to other polymer chains outside the nanotube) in the filament These additional bonds provide additional mechanical strength. The number of bonds may be further enhanced by pretreating the nanotubes to create defects in the nanotubes to form sites along the walls for additional polymer-to-nanotube bonds. The aligned filaments may be radiated to create additional polymer-to-polymer and polymer-to-nanotube bonds such as between the polymer chain inside the nanotube and the inner walls of the nanotube and to create nanotube-to-nanotube bonds. In the case of carbon fiber manufacture, the carbonized filament may be radiated to create additional carbon-carbon bonds between the CNTs and the carbon from the polymer prior to twisting carbon filaments into the macro fiber.

An exemplary process for the manufacture of reinforced carbon polymer filament with doubly-embedded carbon nanotubes and then carbon fiber from the filament is illustrated in FIGS. 3 through 6. The same process can be used to manufacture carbon-based and non-carbon stabilized filaments. The process of manufacture entails the same core sequence of spinning and stabilizing to form the stabilized polymer filament from a precursor as does the conventional process with a few select modifications to provide additional bonds to the CNTs, hence increased mechanical strength. To then form a carbon fiber entails the same additional steps of carbonizing, surface treatment and sizing steps to produce a stabilized carbon filament or carbon fiber with the possible addition of another radiation step to form additional carbon bonds.

Carbon nanotubes grown using current techniques are closed. Consequently the CNTs 90 are pretreated (step 92) to remove the end caps and provide open-end CNTs 94. This can be accomplished by heating the CNTs in an acid bath 96 such as nitric or hydrochloric for several hours. The CNTs may be pretreated, before or after the acid bath, to create defects along the walls in the nanotubes to form sites for forming additional polymer-to-nanotube bonds (carbon-carbon bonds in this example) by, for example, radiating the CNTs (step 98). Most CNTs will have a few random wall defects if not carefully prepared but the density varies greatly. Radiation pretreatment and as part of the bonding process allows for control over the number and uniformity of the wall defects.

A blender 100 mixes (step 102) the open CNTs 94 with a monomer 103 having a carbon-carbon backbone such as acrylonitrile (CH2CHCN) and a catalyst 107 into mixture 104. The monomer and catalyst are then dissolved in a solvent and the solvent is removed (step 105) leaving a polymer precursor 106 in which open CNTs are filled with monomer and catalyst as shown in FIG. 5a. Any solvent such as alcohols, ketones, water, etc. capable of dissolving the monomer and catalyst into the CNTs may be used. It may be preferable to use a "supercritical" fluid as the solvent Supercritical fluids are those with the correct pressure and temperature to be in a state where gas and liquid are indistinguishable. Supercritical fluids have dissolving properties of liquids and diffusing properties of gases. A monomer and catalyst can be dissolved in a supercritical fluid which can penetrate into nanotubes. Modifying the pressure and temperature of the fluid will change the fluid from the supercritical state leaving the monomer and catalyst behind inside the nanotube.

The blender polymerizes the mixture (step 108) into a composite CNT-PAN polymer 110 including long polymer chains 112 formed from the monomers and CNTs 94 embedded therein. In polymer chemistry, polymerization is a process of reacting monomer molecules together in a chemical reaction to form three-dimensional networks or polymer chains. There are two main categories of polymerization—addition or condensation reactions. The type of polymerization is dependent on the chemistry of the monomer(s) which are used to build the polymer.

At this point in the conventional process closed CNTs are encapsulated in the polymer matrix formed by the long polymer chains and may have a few bonds to the chains at random defect sites in the CNTs. By contrast, in the current process the open CNTs 94 are embedded with the polymer chains 112 and form bonds 114 between the open ends of the CNTs and chains outside the CNTs in addition to any defect sites. Furthermore, one or more polymer chains will extend through the inside of the open CNTs. These chains may be a single unitary chain or segments of chains bound together. The blender spins the CNT-PAN polymer (step 116) to extrude CNT-PAN polymer filaments 118, which are washed and stretched (step 120) in a quench bath 122 to produce aligned filaments 124 in which the polymer chains 112 are aligned along a common axis and having a final diameter as shown in FIG. 5c.

Figure 5B:
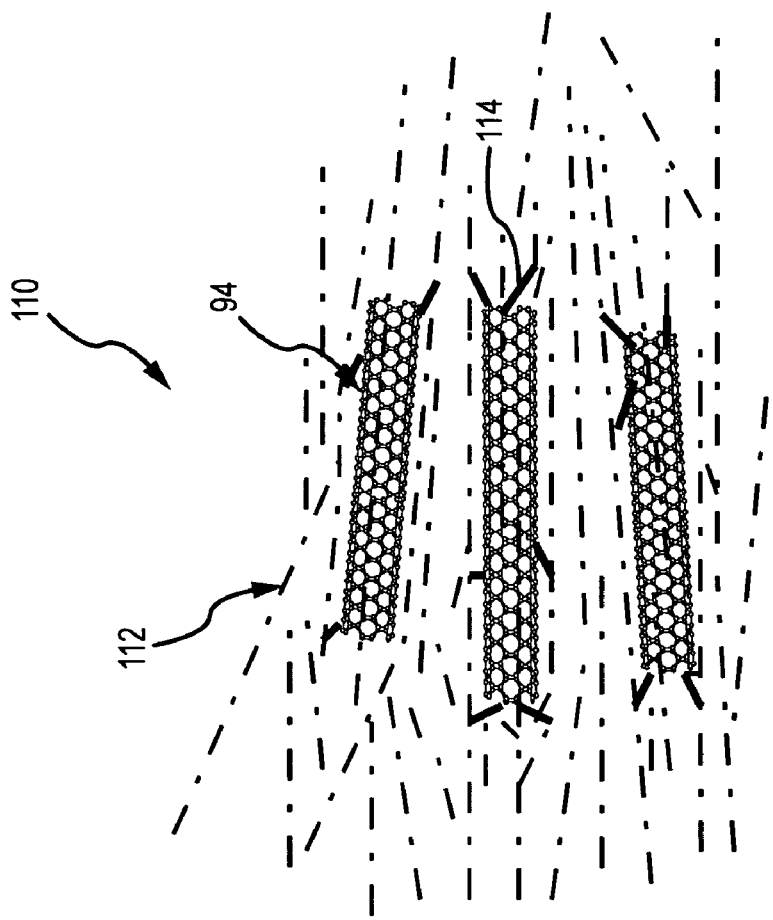
Figure 5A:
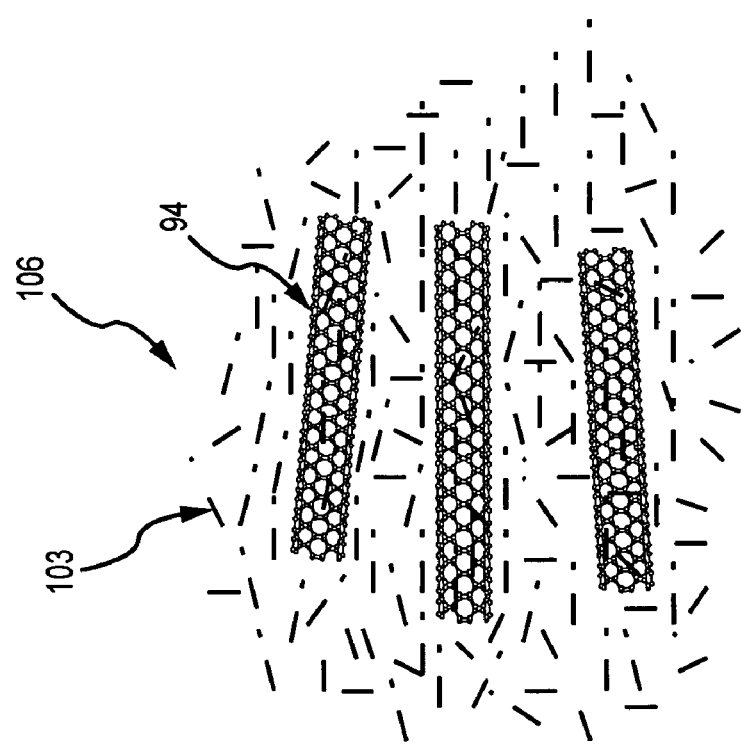
Figure 5E:
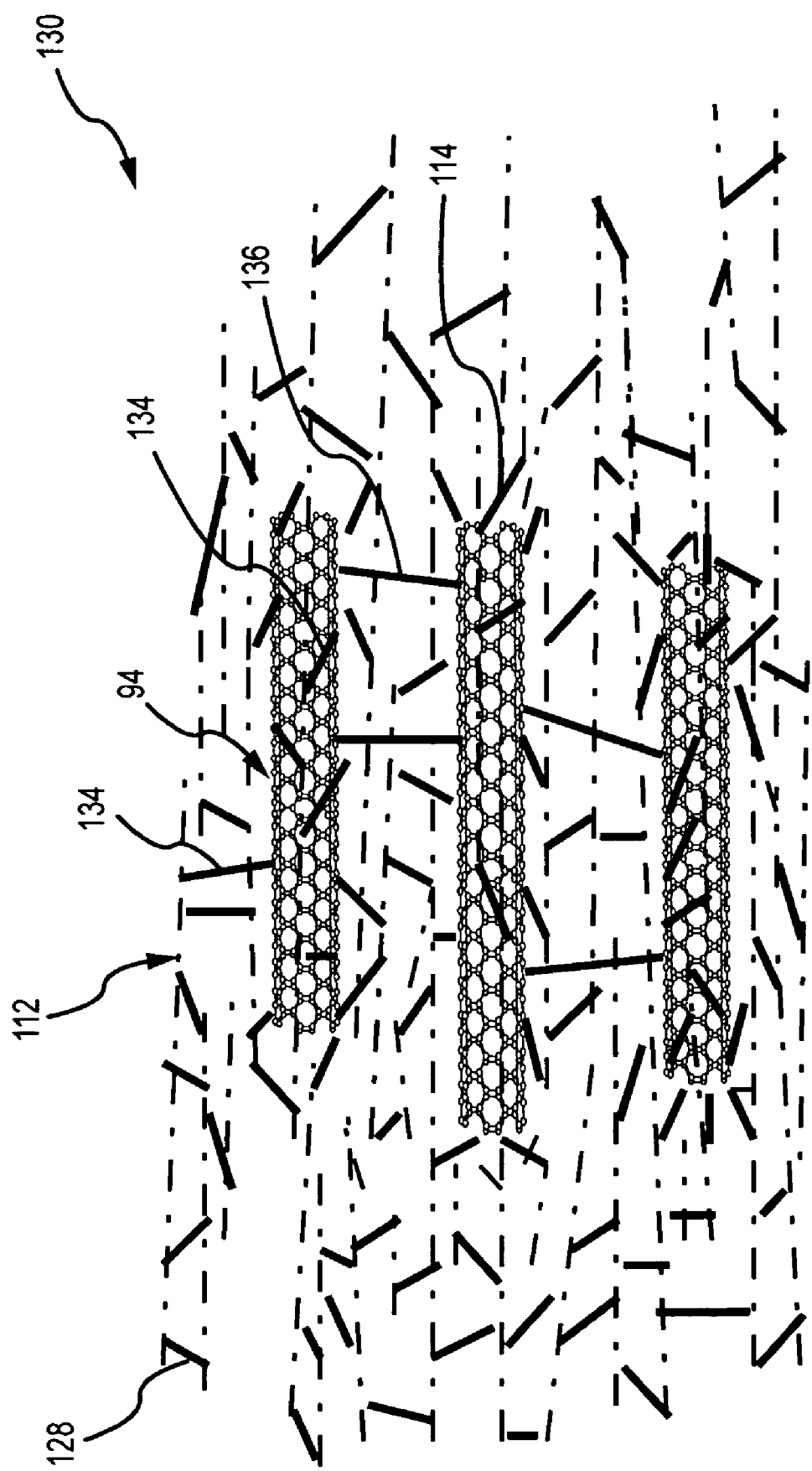

After spinning, the aligned filaments are transferred to a furnace 125 and heated in air (200-300 degrees C. for up to 120 minutes for example) (step 126) to form poly/poly bonds 128 between individual polymeric chains and some polymer-to-nanotube bonds 134 to produce stabilized filaments 130 as shown in FIG. 5d. As shown polymeric chains in which the CNTs are embedded are bonded to other polymeric chains increasing the bond strength to the CNTs. The aligned filaments may be radiated (inside the furnace or removed and radiated) (step 132) to create additional polymer-to-nanotube bonds 134 such as between the polymer chain inside the nanotube and the inner walls of the nanotube and between polymer chains outside the nanotube and the walls of the nanotube and to create nanotube-to-nanotube bonds 136 as shown in FIG. 5e. Radiation creates additional defects or 'dangling bonds' 137 as shown in FIG. 6a in the CNTs to form additional bonds 134 to polymer chain 112 as shown in FIG. 6b. Dangling bonds are not a requirement for polymer/CNT bonds to form. Each carbon atom in the nanotube has an electron available to participate in weak bonding. However, formation of polymer/CNT bonds at the location of dangling bonds 137 creates a stronger bond. The filament may be radiated with, for example, energetic particles, gamma-radiation, UV light or an electron beam. This additional step may also create additional poly/poly bonds 128. These additional bonds "doubly-embed" the CNTs in the polymer matrix further increasing the mechanical strength of the filament. In some applications it may be desirable to skip thermal bonding step 126 and use only a radiation process.

In general chemical, thermal and radiation processes can create each of the bond structures e.g. poly-to-poly, poly-to-CNT and CNT-to-CNT. However some processes may be more efficient depending on the exact chemistry of the polymer/catalyst that is used. In a typical sequence the chemical process during polymerization would form a few poly-to-CNT bonds at the open ends of the CNTs. The thermal process would form the majority of the poly-to-poly bonds between polymer chains and some poly-to-CNT bonds along the walls of the CNTs. Radiation would form additional poly-to-CNT bond along additional sites in the CNT walls and would form the CNT-to-CNT bonds.

The process can be stopped at this point to produce the doubly-embedded CNT stabilized polymer filaments 130. The filaments can be used 'as is' or processed into fibers by the same or another manufacturer. In particular non-carbon filaments may not be grouped into macro fibers. The non-carbon or polymer filament maybe formed with a larger diameter initially instead of twisting many filaments into a macro fiber as is done with carbon fiber.

Figure 7B:
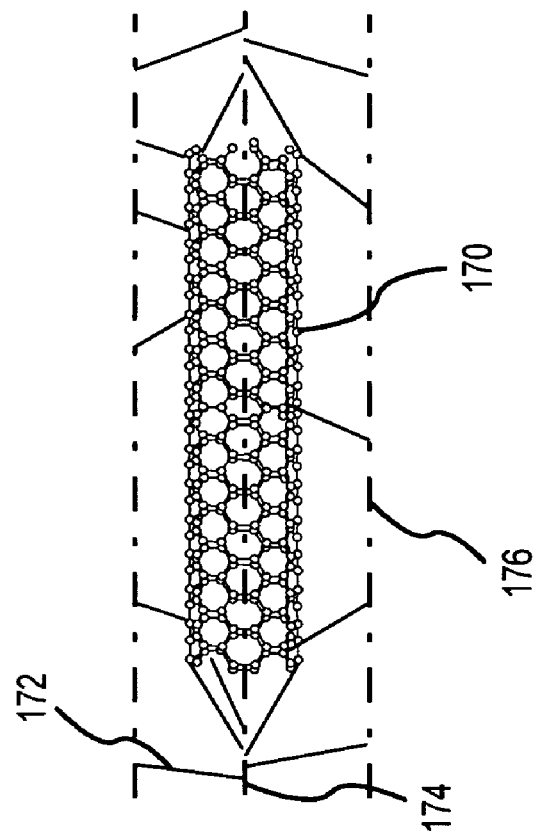
FIGS. 7a and 7b are a side-by-side comparison of a single-embedded closed nanotube using known reinforcement techniques and a doubly-embedded open nanotube using reinforcement techniques in accordance with the present invention.
Figure 7A:
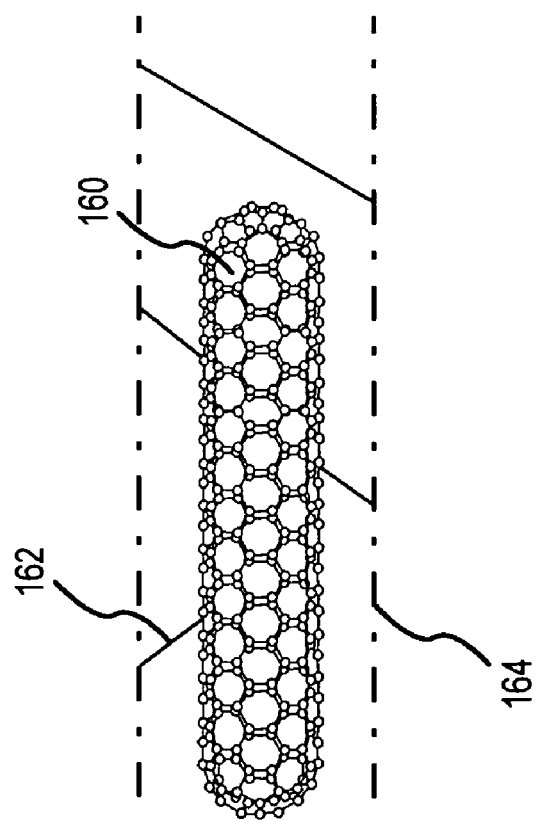

A side-by-side comparison of a closed CNT 160 encapsulated in a polymer matrix by a few bonds 162 between random defects in the walls of the CNT and outside polymer chains 164 in accordance with conventional manufacturing and of an open CNT 170 doubly-embedded in a polymer matrix by many bonds 172 between (a) open ends of the CNT and a polymer chain 174 extending there through, (b) open ends of the CNT and outside polymer chains 176, (c) inner walls of the CNT and polymer chain 174 (d) outer walls of the CNT and polymer chain 176, and (e) separate CNTs (not shown) is shown in FIGS. 7a and 7b. In a CNT reinforced carbon polymer filament all of the bonds are carbon-carbon. In other filament and nanotube configurations different bonds structures will exist.

In the doubly-embedded structure, it is preferable that a single polymer chain extends from each end of the CNT and bonds to the inner walls of the CNT. However, a polymer that is formed inside the CNT that consists of several shorter strands can be bonded to each other and to the inner wall of the CNT with similar strength increasing properties. Multiple parallel strands can also be possible in larger diameter CNTs. Further, if the CNT is open on one end only but with the polymer reaching the end or extending beyond the end, an extra connection will still be possible to the external polymer by a bonding process. This will still add strength. Generally, the polymer chains will be parallel to the axis of the tube since that is a minimal energy configuration and will tend to be pushed into that configuration as they are formed.

To form a macro carbon fiber, the stabilized filaments are heated (carbonized) in the furnace (step 140) in an atmosphere without oxygen at, for example, temperatures of 1000-3000 degrees C. to produce carbonized filaments 142. This removes non-carbon atoms from the filaments and forms more tightly bonded carbon atoms parallel to the long axis of the filament. This process promotes the formation of graphite flakes in the filaments. After carbonizing, the surface of the filaments are oxidized (step 144) and passed through rollers 146 to form a coated filament 148 to provide better chemical bonding properties and to roughen the surface for better mechanical bonding properties. The filament are coated (sized) with materials such as epoxy, polyester, nylon, urethane and others compatible with the adhesives used to form composite materials. Prior to surface treatment, the filaments may be radiated to create additional carbon-carbon bonds to bond sites created by the carbonization process (step 150). The sized filament 148 is wound onto a bobbin and loaded onto a draw/twisting machine 152. The machine passes the coated filament through rollers 154 to draw and stretch the filament and twist it into the macro carbon fiber 156 (step 158).

The described process for forming doubly-embedded CNT carbon filaments and fiber is merely exemplary. The process can be modified and reconfigured for these and other materials without departing from the scope of the present invention. A contribution of the present invention is to provide a polymer precursor in which the open nanotubes are embedded within the polymer matrix, i.e. the polymer and catalyst fill the open nanotubes. During subsequent polymerization such a polymer precursor will form more bonds to the nanotubes so that it is doubly-embedded in the matrix increasing the strength of the resulting polymer filament Other contributions of the present invention are techniques to pretreat the nanotubes to form additional bonding sites and additional processing such as radiation to form additional bonding sites. Each of these contributions leads to a reinforced filament having doubly-embedded nanotubes.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A method of producing a stabilized filament including doubly-embedded nanotubes, comprising:
   mixing a monomer of polyacrylonitrile (PAN), open-ended nanotubes and a catalyst into a polymer precursor;
   dissolving the PAN monomer and catalyst in a solvent to fill the open nanotubes with monomer and catalyst;
   polymerizing the precursor to form a nanotube-polymer composite of polymer chains formed from the monomer with the nanotubes embedded therein, said composite including polymer chains both outside the nanotubes and inside and extending through the open-ended nanotubes;

forming the nanotube-polymer composite into a filament;
processing the filament to create polymer-to-polymer bonds between polymer chains inside and outside the nanotubes and polymer-to-nanotube bonds between polymer chains both inside and outside of the nanotubes and the nanotubes to form a stabilized filament in which the nanotubes are doubly-embedded; and
heating the stabilized filament to produce a carbonized filament in which the nanotubes are doubly-embedded.

2. The method of claim 1, wherein said nanotubes are carbon nanotubes.

3. The method of claim 1, wherein the nanotubes are formed from an element selected from among Carbon, Germanium, Boron, Boron-Nitride, Boron-Carbide, $C_iB_jN_k$, Silicon and Silicon-Carbide.

4. The method of claim 1, wherein processing the filament comprises radiating the filament to create defects in the nanotubes and additional polymer-to-nanotube bonds.

5. The method of claim 1, further comprising:
pretreating the nanotubes to generate defects along the walls in the nanotubes that form sites for additional polymer-to-nanotube bonds.

6. The method of claim 1, wherein both ends of the nanotubes are open.

7. The method of claim 6, wherein processing the filament creates polymer-to-nanotube bonds between polymer chains outside the nanotube and exterior walls of the nanotube and creates polymer-to-nanotube bonds between polymer chains inside the nanotube and inner walls of the nanotube.

8. The method of claim 7, wherein processing the filament comprises heating the filament to create polymer-to-polymer bonds and polymer-to-nanotube bonds.

9. The method of claim 7, wherein processing the filament comprises radiating the filament to create defects in the nanotubes and additional polymer-to-nanotube bonds between the polymer chain inside the nanotube and the inner walls of the nanotube and between polymer chains outside the nanotube and the exterior walls of the nanotube.

10. The method of claim 1, wherein polymerizing the precursor forms polymer-to-nanotube bonds between polymer chains and the open ends of the nanotubes.

11. The method of claim 1, wherein a supercritical fluid is used as the solvent in which to dissolve the monomer and catalyst.

12. A method of producing a stabilized filament, comprising:
providing a nanotube-polymer composite from a polyacrylonitrile (PAN) precursor including open-ended nanotubes and polymer chains both outside and inside and extending through the nanotubes and polymer-to-nanotube bonds at the open ends of the nanotubes;
forming the nanotube-polymer composite into a filament;
processing the filament to create polymer-to-polymer bonds between polymer chains inside and outside the nanotubes and polymer-to-nanotube bonds between polymer chains inside and outside the nanotubes and the nanotubes to form a stabilized filament in which the nanotubes are doubly-embedded; and
heating the stabilized filament to produce a carbonized filament in which the nanotubes are doubly-embedded.

13. The method of claim 12, further comprising:
pretreating the nanotubes to generate defects in the nanotubes that form sites for additional polymer-to-nanotube bonds.

14. The method of claim 12, wherein processing the filament comprises heating the filament to create polymer-to-polymer bonds and polymer-to-nanotube bonds.

15. The method of claim 14, wherein processing the filament comprises radiating the filament to create defects in the nanotubes and additional polymer-to-nanotube bonds.

16. A method of producing a stabilized filament including doubly-embedded nanotubes, comprising:
mixing a monomer having a carbon-based backbone, open-ended carbon nanotubes and a catalyst into a polymer precursor;
dissolving the monomer and catalyst in a solvent to fill the open nanotubes with monomer and catalyst;
polymerizing the precursor to form a nanotube-polymer composite of polymer chains formed from the monomer with the nanotubes embedded therein, said composite including polymer chains both outside the nanotubes and inside and extending through the open-ended nanotubes, said polymerization forming polymer-to-nanotube bonds between the polymer chains and the open ends of the nanotubes;
forming the nanotube-polymer composite into a filament;
heating the filament to create polymer-to-polymer bonds between polymer chains, at least some said polymer-to-polymer bonds formed between a polymer chain outside the nanotube and a polymer chain inside a nanotube, and to create polymer-to-nanotube bonds between polymer chains and the nanotubes; and
radiating the filament to create defects in the carbon nanotubes and additional polymer-to-nanotube bonds between the polymer chain inside the nanotube and the inner walls of the nanotube and between polymer chains outside the nanotube and the exterior walls of the nanotube to produce the stabilized filament in which the nanotubes are doubly-embedded.

17. The method of claim 16, wherein the monomer's carbon-based backbone is polyacrylonitrile (PAN).

18. The method of claim 16, wherein the step of radiating the filament forms nanotube-to-nanotube bonds between nanotubes.

19. A method of producing a stabilized filament including doubly-embedded nanotubes, comprising:
pretreating open-ended nanotubes to generate defects along the walls in the nanotubes;
mixing a monomer, the open-ended nanotubes and a catalyst into a polymer precursor;
dissolving the monomer and catalyst in a solvent to fill the open nanotubes with monomer and catalyst;
polymerizing the precursor to form a nanotube-polymer composite of polymer chains formed from the monomer with the nanotubes embedded therein, said composite including polymer chains both outside the nanotubes and inside and extending through the open-ended nanotubes;
forming the nanotube-polymer composite into a filament; and
processing the filament to create polymer-to-polymer bonds between polymer chains and polymer-to-nanotube bonds between polymer chains both inside and outside of the nanotubes and the open ends of and defects along the walls in the nanotubes to form a stabilized filament in which the nanotubes are doubly-embedded.

20. A method of producing a stabilized filament including doubly-embedded nanotubes, comprising:
mixing a monomer, open-ended nanotubes and a catalyst into a polymer precursor;
dissolving the monomer and catalyst in a solvent to fill the open nanotubes with monomer and catalyst;

polymerizing the precursor to form a nanotube-polymer composite of polymer chains formed from the monomer with the nanotubes embedded therein, said composite including polymer chains both outside the nanotubes and inside and extending through the open-ended nanotubes;

forming the nanotube-polymer composite into a filament;

heating the filament to create polymer-to-polymer bonds between polymer chains, at least some said polymer-to-polymer bonds formed between a polymer chain outside the nanotube and a polymer chain inside a nanotube, and to create polymer-to-nanotube bonds between polymer chains and the nanotubes; and radiating the filament to create defects in the carbon nanotubes and additional polymer-to-nanotube bonds between the polymer chain inside the nanotube and the inner walls of the nanotube and between polymer chains outside the nanotube and the exterior walls of the nanotube to form a stabilized filament in which the nanotubes are doubly-embedded.

* * * * *